(12) United States Patent
Nishida et al.

(10) Patent No.: US 8,194,499 B2
(45) Date of Patent: Jun. 5, 2012

(54) ULTRASONIC UNDERWATER DETECTOR WITH VOLTAGE AND ENVELOPE CONTROL

(75) Inventors: Masaru Nishida, Nishinomiya (JP);
Itsuo Fukuoka, Nishinomiya (JP);
Yasunobu Asada, Nishinomiya (JP);
Satoshi Misonoo, Nishinomiya (JP);
Mitsuhiro Inouchi, Nishinomiya (JP);
Shinji Ogawa, Nishinomiya (JP);
Satoru Arakane, Nagoya (JP)

(73) Assignee: Furund Electric Company Limited, Nishinomiya (JP)

( * ) Notice: Subject to any disclaimer, the term of this patent is extended or adjusted under 35 U.S.C. 154(b) by 398 days.

(21) Appl. No.: 12/363,377

(22) Filed: Jan. 30, 2009

(65) Prior Publication Data
US 2009/0201766 A1 Aug. 13, 2009

(30) Foreign Application Priority Data
Jan. 31, 2008 (JP) .................................. 2008-021385

(51) Int. Cl.
*G01S 15/00* (2006.01)
(52) U.S. Cl. ........................................................ 367/101
(58) Field of Classification Search .................... 367/137
See application file for complete search history.

(56) References Cited

U.S. PATENT DOCUMENTS

| | | | | |
|---|---|---|---|---|
| 4,700,569 A * | 10/1987 | Michalski et al. | ........... | 73/290 V |
| 6,122,223 A * | 9/2000 | Hossack | ........................ | 367/11 |
| 6,157,593 A * | 12/2000 | Costa et al. | .................... | 367/137 |
| 6,279,396 B1 * | 8/2001 | Imagawa et al. | ................ | 73/597 |
| 7,215,599 B2 * | 5/2007 | Nishimori et al. | ............. | 367/138 |
| 7,269,098 B2 * | 9/2007 | Nishida | ......................... | 367/137 |
| 2002/0126579 A1 * | 9/2002 | Gualtieri | ....................... | 367/103 |
| 2004/0184351 A1 * | 9/2004 | Nishimori et al. | ............. | 367/103 |
| 2004/0240628 A1 * | 12/2004 | Hayashi | ........................ | 379/56.1 |
| 2005/0007879 A1 * | 1/2005 | Nishida | .......................... | 367/99 |
| 2006/0236770 A1 * | 10/2006 | Nishimori et al. | ............... | 73/620 |
| 2007/0033369 A1 * | 2/2007 | Kasama et al. | ................ | 711/170 |

\* cited by examiner

*Primary Examiner* — Thomas Tarcza
*Assistant Examiner* — James Hulka
(74) *Attorney, Agent, or Firm* — Birch, Stewart, Kolasch & Birch, LLP

(57) ABSTRACT

The present disclosure provides an underwater detector including a power source for applying a predetermined voltage, a voltage control circuit for controlling the voltage based on a control signal, a gate signal generating module for outputting a gate signal, a switching circuit for outputting a reference signal based on the voltage controlled by the voltage control circuit and the gate signal outputted from the gate signal generating module, and a transducer for transmitting an ultrasonic signal underwater, an envelope of which being controlled based on a waveform of the control signal by being applied with the reference signal.

2 Claims, 12 Drawing Sheets

PRIOR ART

ULTRASONIC UNDERWATER DETECTOR WITH VOLTAGE AND ENVELOPE CONTROL

CROSS-REFERENCE TO RELATED APPLICATION(S)

This application claims priority under 35 U.S.C. §119 to Japanese Patent Application No. 2008-021385, which was filed on Jan. 31, 2008, the entire disclosure of which is hereby incorporated by reference.

TECHNICAL FIELD

The present invention relates to an underwater detector for transmitting an envelope-controlled ultrasonic signal underwater.

BACKGROUND

An underwater detector detects a state underwater by driving a transducer to transmit an ultrasonic signal and thereafter, receives an echo signal reflected by fish and a target such as the bottom of the sea. At this time, the underwater detector is required to have a capability of suppressing the occurrence of spurious signals.

In a received signal in the case of detection by the use of a pulse compression technique, a side lobe with respect to time called a "range side lobe" appears, as shown in FIG. 9. A small range side lobe level is a capability required for the underwater detector, for example.

Here, JP2004-177276(A) discloses that spurious signals can be prevented from occurring by making more gentle the rising up and falling edge of the envelope (hereinafter, referred to as "envelope control") of the ultrasonic signal to be transmitted underwater.

It is also known that the range side lobe which appears in the case of underwater detection by use of the pulse compression technique can be made small by transmitting an envelope controlled ultrasonic signal.

For this reason, in order to suppress the occurrence of spurious signals and to make the range side lobe level small, an underwater detector 100 of related art performs the envelope control of the ultrasonic signal with a Pulse-Width Modulation method (PWM).

Hereinafter, the underwater detector 100 is described with reference to FIGS. 10 to 12. In the underwater detector 100, as shown in FIG. 10, a switching circuit 10 generates a reference signal $V_{TD}$ under a constant voltage supplied from a power source HV. At this time, a gate signal generating module 20 pulse-width modulates the reference signal $V_{TD}$. Then, the reference signal $V_{TD}$ is applied to a transducer 30 to transmit an ultrasonic signal Pr having an envelope controlled with pulse-width modulation underwater.

Specifically, as shown in FIG. 11, the switching circuit 10 is a full bridge circuit. The switching circuit 10 is mainly composed of a FET1 to a FET4. Switching of the FETs 1 to 4 is controlled by gate signals G1 to G4 outputted from the gate signal generating module 20 (see FIG. 10), respectively. Each gate signal is a pulse-width modulated binary signal of Hi and Lo, as shown in (a) of FIG. 12. When the gate signal G1 is Hi, the FET1 is ON. When the gate signal G2 is Hi, the FET2 is ON. When the gate signal G3 is Hi, the FET3 is ON. When the gate signal G4 is Hi, the FET4 is ON.

Then, when both the FET1 and the FET4 are ON under a constant voltage outputted from the power source HV, a current in the positive direction flows to a primary side of a transformer, whereas when both the FET2 and the FET3 are ON, a current in the negative direction flows. In this way, the reference signal $V_{TD}$ based on a waveform of each gate signal is generated on the primary side of the transformer, as shown in (b) of FIG. 12.

The reference signal $V_{TD}$ generated as the above is subjected to a voltage rising in the transformer and applied to the transducer 30 such that the transducer 30 is driven. As a result, the ultrasonic signal Pr envelope controlled as shown in (c) of FIG. 12 can be transmitted underwater.

However, switching of such as the FET provided to the switching circuit 10 has a response speed limit, and thus does not respond if the gate signal does not rise for a predetermined time or more. Therefore, since a pulse width Tb of the reference signal $V_{TD}$ can not be set to a predetermined time or less, the envelope of the ultrasonic signal Pr, controlled by pulse-width modulation, has not been able to have the controlled width made sufficiently large.

The controlled width of the envelope is largest when the pulse width Tb of the reference signal is modulated from a response limit time (referred to as "min") of the FET and the like to a time which is the same as the pulse interval Ta (referred to as "max") as shown in (b) of FIG. 12. However, because even the controlled width of the envelope at this time is not sufficient, spurious signals have occurred. In addition, the range side lobe level has not been able to be made small in case of using pulse compression.

SUMMARY

The invention is made in consideration of such a condition, and provides an underwater detector which achieves an envelope control where a controlled width can be made larger, and which can prevent spurious signals from occurring. Further, the invention provides an underwater detector which can make the range side lobe level small when using the pulse compression technique.

According to an aspect of the invention, an underwater detector is provided. The underwater detector includes a power source for applying a predetermined voltage, a voltage control circuit for controlling the voltage based on a control signal, a gate signal generating module for outputting a gate signal, a switching circuit for outputting a reference signal based on the voltage controlled by the voltage control circuit and the gate signal outputted from the gate signal generating module, and a transducer for transmitting an ultrasonic signal underwater, an envelope of which being controlled based on a waveform of the control signal by being applied with the reference signal.

The gate signal generating module may output a gate signal, and a rising edge cycle of the gate signal may be changed. The transducer may transmit an ultrasonic signal of which the frequency being changed with time.

According to another aspect of the invention, an underwater detector is provided. The underwater detector includes at least two power sources for applying different voltages, a voltage control circuit for controlling the voltage by switching the power sources, a gate signal generating module for outputting a pulse-modulated gate signal, a switching circuit for outputting a reference signal based on the voltage of the power source switched by the voltage control circuit and the gate signal outputted from the gate signal generating module, and a transducer for transmitting an ultrasonic signal underwater by being applied with the reference signal.

A pulse width of the reference signal immediately after switching of the power source may be determined based on the voltage of the power source before and after the switching and the pulse width of the reference signal immediately before the switching.

The gate signal generating module may output a gate signal, and a rising edge cycle of the gate signal may be changed. The transducer may transmit an ultrasonic signal of which the frequency being changed with time.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Embodiment 1

Figure 1:
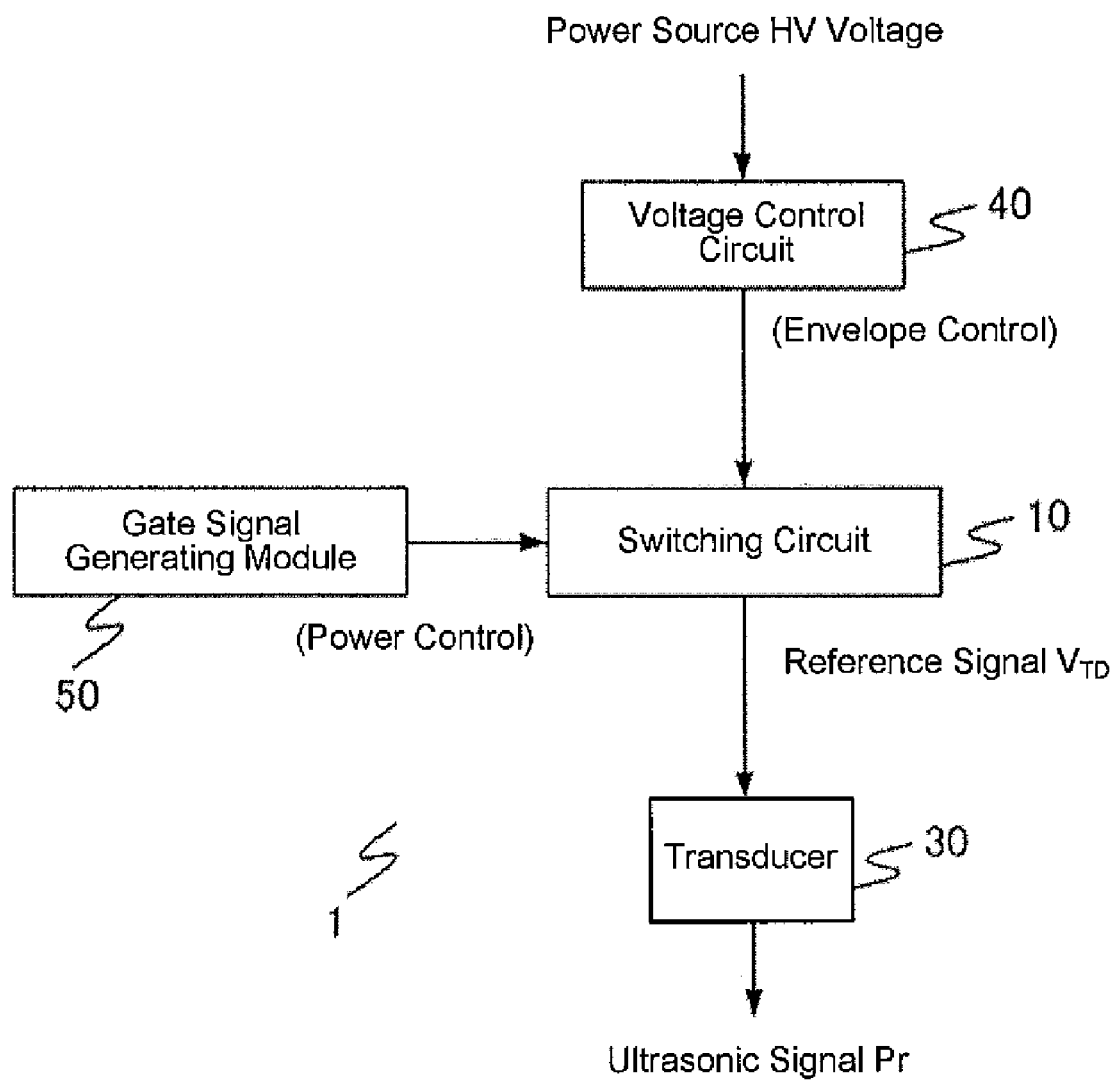
FIG. 1 is a block diagram showing a configuration of an underwater detector according to a first embodiment of the invention.
Figure 2:
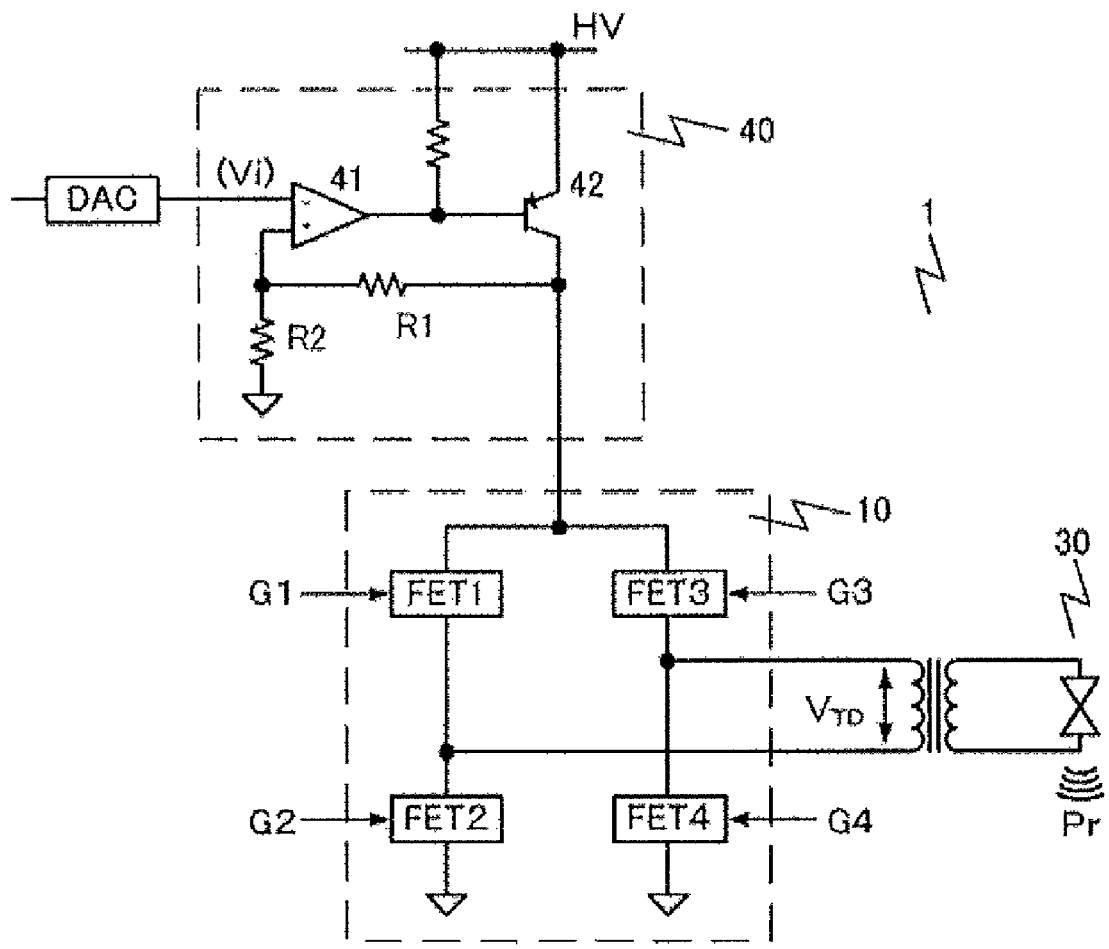
FIG. 2 is a circuit diagram showing an example the configuration of the underwater detector shown in FIG. 1.

Hereinafter, an embodiment of the invention is described with reference to FIG. 1 to FIG. 4. Applicable water area of the underwater detector of this embodiment and other embodiment disclosed herein may be, but not limited to sea, and thereby it may include lake, river and the like. In an underwater detector 1 of this embodiment, voltage supplied from a power source HV to a switching circuit 10 is controlled by a voltage control circuit 40, as shown in FIG. 1. Based on the controlled voltage, a reference signal $V_{TD}$ is generated by the switching circuit 10. At this time, a pulse width of the reference signal $V_{TD}$ is controlled to have a constant width based on a signal outputted from a gate signal generating module 50. Application of such a controlled reference signal $V_{TD}$ to a transducer 30 allows an ultrasonic signal Pr to have a desired envelope to be transmitted underwater.

Here, the envelope of the ultrasonic signal Pr is determined based on a voltage waveform controlled by the voltage control circuit 40, and the controlled width of the envelope is equal to the controlled width of the voltage. Therefore, the controlled width of the envelope can be increased by increasing the controlled width of the voltage.

The underwater detector 100 of related art has performed the envelope control of the ultrasonic signal Pr by modulating the pulse width of the reference signal $V_{TD}$. The underwater detector 1 of this embodiment performs the envelope control such that the voltage control circuit 40 controls the voltage. Therefore, since the pulse width can be a constant width, the pulse width of the reference signal $V_{TD}$ can be varied uniformly every transmitting of a signal, and the gate signal generating module 50 can control the power of the ultrasonic signal Pr.

Next, a circuit configuration which is able to achieve the envelope control described above is explained with reference to FIG. 2. The switching circuit 10 is a full bridge circuit composed mainly of a FET1 to a FET4, which are switched by gate signals G1 to G4, respectively, outputted from the gate signal generating module 50 (see FIG. 1).

Each gate signal is a binary signal of Hi and Lo. When the gate signal G1 is Hi, the FET1 is ON. When the gate signal G2 is Hi, the FET2 is ON. When the gate signal G3 is Hi, the FET3 is ON. When the gate signal G4 is Hi, the FET4 is ON. Then, when both the FET1 and the FET4 are ON, a current in the positive direction flows to a primary side of a transformer, whereas when both the FET2 and the FET3 are ON, a current in the negative direction flows. In this way, the reference signal $V_{TD}$ having the pulse width and a pulse interval based on each gate signal is generated on the primary side of the transformer The voltage control circuit 40 controls the voltage supplied to the switching circuit 10. The power source HV is coupled to the switching circuit 10 via the voltage control circuit 40, which controls the voltage supplied from the power source HV to the switching circuit 10 such that the envelope of the ultrasonic signal Pr has a desired envelope.

Specifically, an error amplifier 41 included in the voltage control circuit 40 has a terminal to which input is a control signal Vi having a desired envelope outputted from a DAC (Digital Analog Converter). The control signal Vi is amplified based on the ratio between a resistance R1 and a resistance R2, and outputted to the base of a transistor 42. The transistor 42 has an emitter connected with the power source HV, and a collector to which output is the voltage controlled by the amplified control signal Vi. In this way, the voltage controlled by the control signal Vi can be outputted to the switching circuit 10 via the transistor 42, enabling an easy voltage control with the large controlled width.

The voltage controlled as the above is supplied to the switching circuit 10 such that the reference signal $V_{TD}$ having a desired voltage is generated on the primary side of the transformer. Then, the reference signal $V_{TD}$, the voltage of which is risen by the transformer, is applied to the transducer 30 such that the ultrasonic signal Pr with the envelope formed having the desired controlled width can be transmitted underwater.

Here, the control signal Vi can be generated easily by use of the DAC, and the controlled width of the control signal Vi can be made larger than the controlled width of the pulse-width modulation method of related art. In other words, the controlled width of the envelope of the ultrasonic signal Pr can be made large more easily than that of related art.

Figure 3:
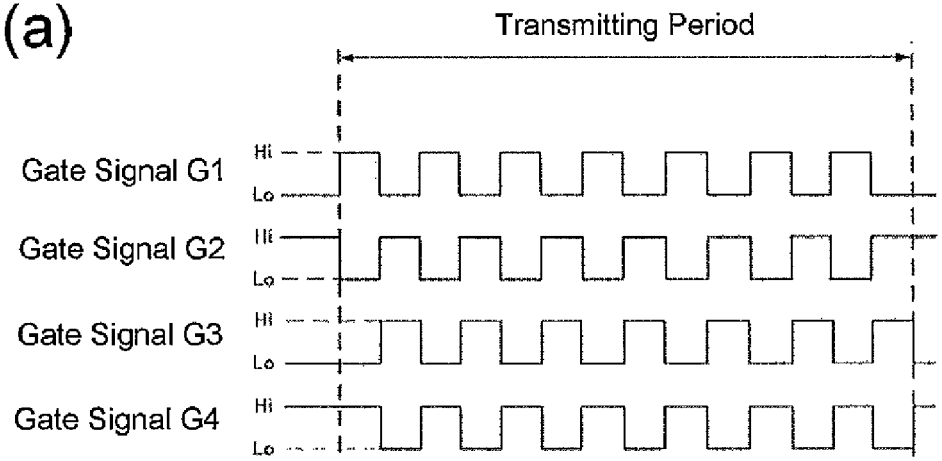
FIG. 3 is graphs showing waveforms of a gate signal, reference signal, and ultrasonic signal of the underwater detector shown in FIG. 1.
Figure 3:
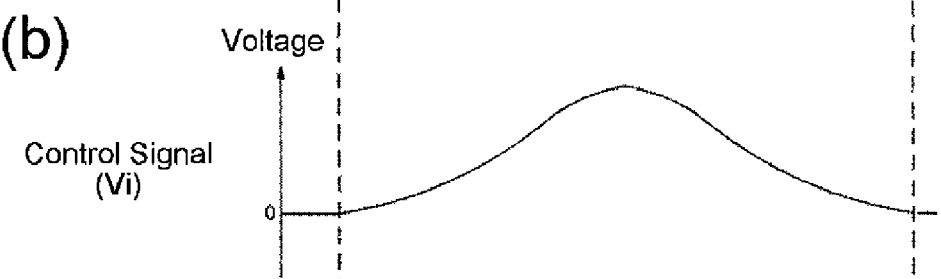
Figure 3:
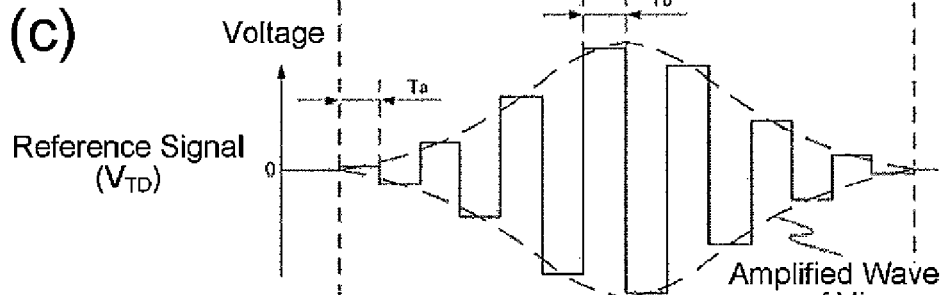
Figure 3:
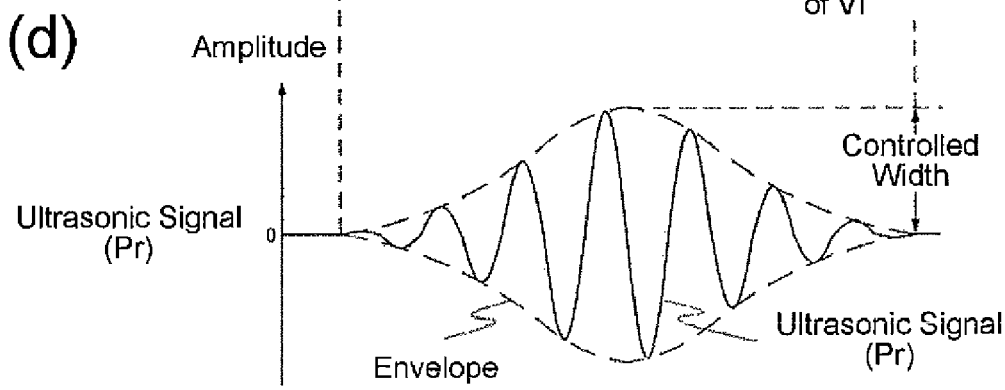

Next, with reference to FIG. 3, a description is given of waveforms from the gate signal G1 to the gate signal G4, the control signal Vi, the reference signal $V_{TD}$ and the ultrasonic signal Pr. FIG. 3 represents each of the signal waveforms during a period of transmitting the signals by the underwater detector 1. The underwater detector 1 performs detection by receiving an echo of the ultrasonic signal Pr during a receiving period (not shown) of a predetermined time provided after the transmitting period.

The gate signal G1 and the gate signal G3 rise respectively with a predetermined duty ratio as shown in (a) of FIG. 3. The gate signal G2 and the gate signal G1 are reversed in phase and the gate signal G4 and the gate signal G3 are reversed in phase.

The control signal Vi has a waveform as shown in (b) of FIG. 3. Supplied to the switching circuit 10 is a voltage having a waveform obtained by amplifying a waveform of the control signal Vi. That is, this control signal Vi controls the envelope of the ultrasonic signal Pr.

The reference signal $V_{TD}$ has a waveform as shown in (c) of FIG. 3, and rises to a positive voltage when both the gate signal G1 and the gate signal G4 are Hi and falls to a negative voltage when both the gate signal G2 and the gate signal G3 are Hi. The ultrasonic signal Pr has a frequency determined by a pulse interval Ta of the reference signal $V_{TD}$ and amplitude determined by a pulse width Tb and the voltage controlled by the control signal Vi. Incidentally, the envelope of the reference signal $V_{TD}$ at the voltage level has a waveform obtained by amplifying the waveform of the control signal Vi.

The reference signal $V_{TD}$ is subjected to a voltage rising and applied to the transducer 30 such that the ultrasonic signal Pr as shown in (d) of FIG. 3 is transmitted underwater. In this way, the controlled width of the envelope of the ultrasonic signal Pr can be determined with the controlled width of the control signal Vi. Further, varying uniformly, the pulse width Tb of the reference signal $V_{TD}$ every transmitting of signals allows the amplitude of the ultrasonic signal Pr to be varied uniformly, and the power of the ultrasonic signal Pr to be controlled as well.

In the underwater detector 1 described above, the ultrasonic signal Pr having the envelope with the controlled width larger than that of related art can be transmitted, enabling spurious signals to be suppressed. Further, in a case of detection by use of the pulse compression technique, the range side lobe level can be made small.

Figure 4:
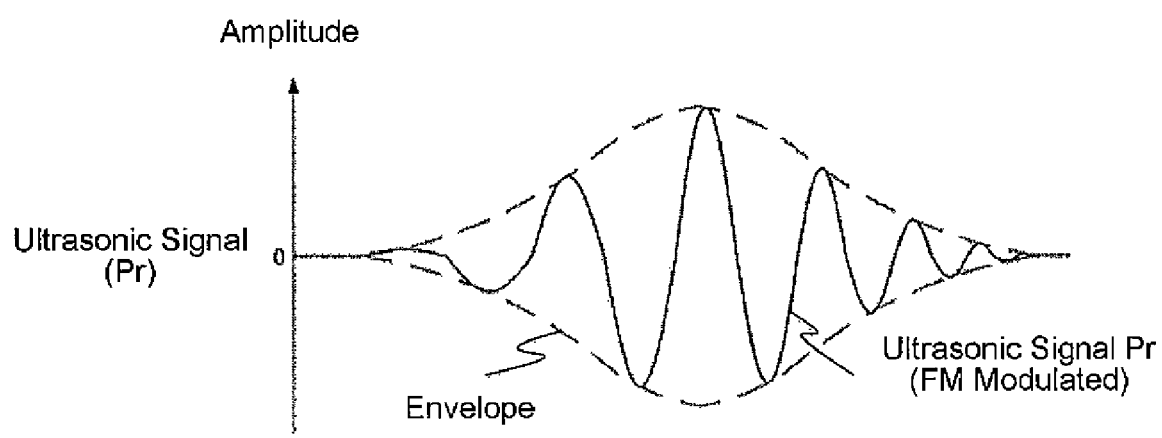
FIG. 4 is a graph showing a waveform of a modulated ultrasonic signal.

The pulse compression can be performed by transmitting the ultrasonic signal of which the frequency is changed (FM modulated) with time as shown in FIG. 4, and generating a signal composed of desired frequency components based on the echo signal. In order to transmit the ultrasonic signal, the frequency of which is changed with time, a rising edge cycle of each gate signal may be changed by the gate signal generating module 50 to generate the reference signal $V_{TD}$ of which the pulse interval Ta is changed with time. By using such a pulse compression, the received signal of a short time width can be obtained by use of the ultrasonic signal Pr of a long time width, the detection distance can be long and the distance resolution can be improved.

Otherwise, the gate signal generating module 50 may perform the envelope control of the ultrasonic signal Pr by the pulse-width modulation method, and not perform the power control of the ultrasonic signal Pr. By doing so, the envelope control can be performed by both the voltage control and the pulse-width modulation method, enabling the envelope control of the larger controlled width.

Embodiment 2

Hereinafter, another embodiment of the invention is described with reference to FIG. 5 to FIG. 8. Note that an underwater detector 2 of this embodiment is different from the underwater detector 1 of the previous embodiment in the voltage control circuit and the gate signal generating module. A voltage control circuit 60 and gate signal generating module 70 of the underwater detector 2 is described and a description of other configurations is omitted in the following.

Figure 5:
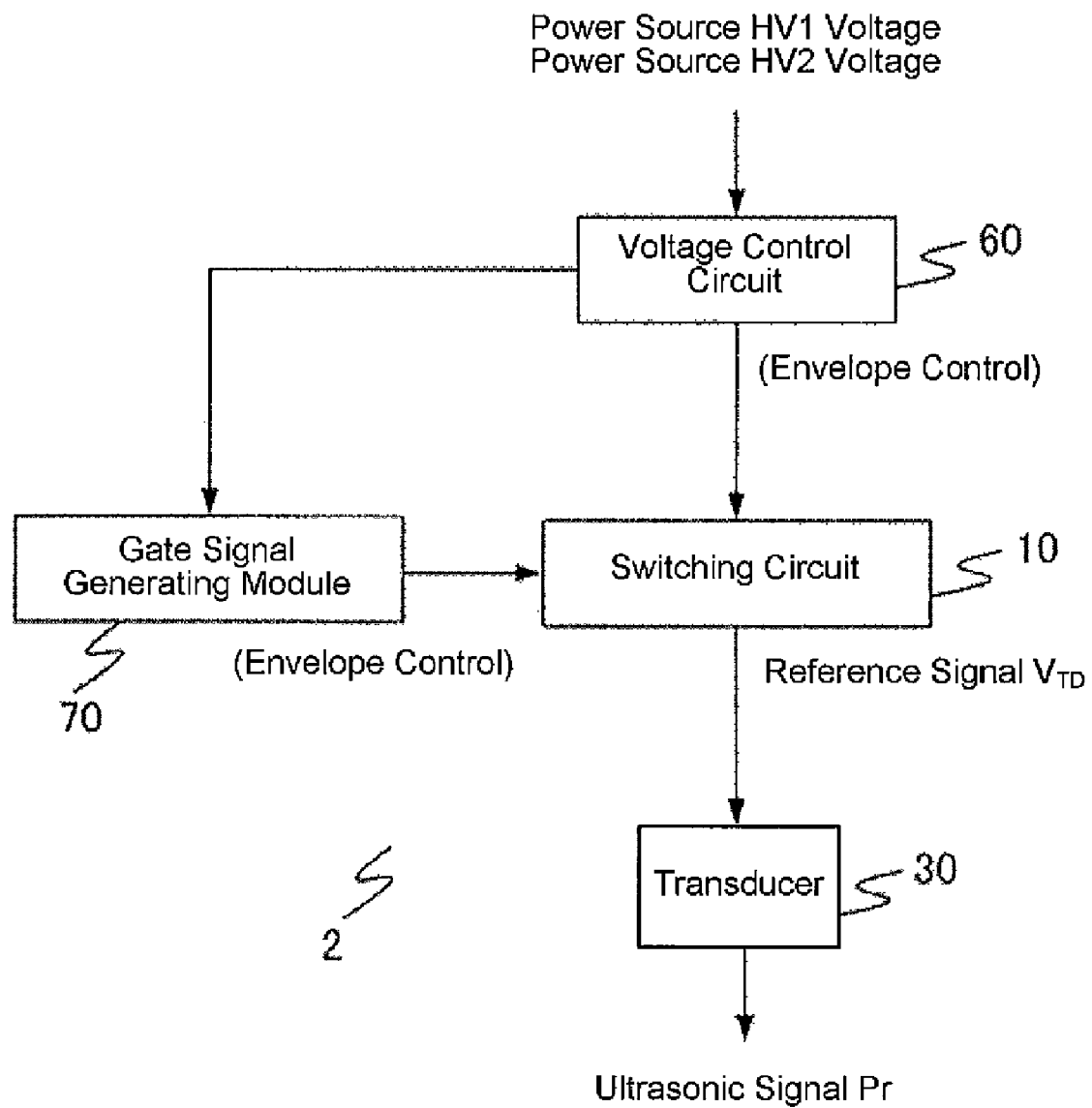
FIG. 5 is a block diagram showing a configuration of an underwater detector according to a second embodiment of the invention.
Figure 6:
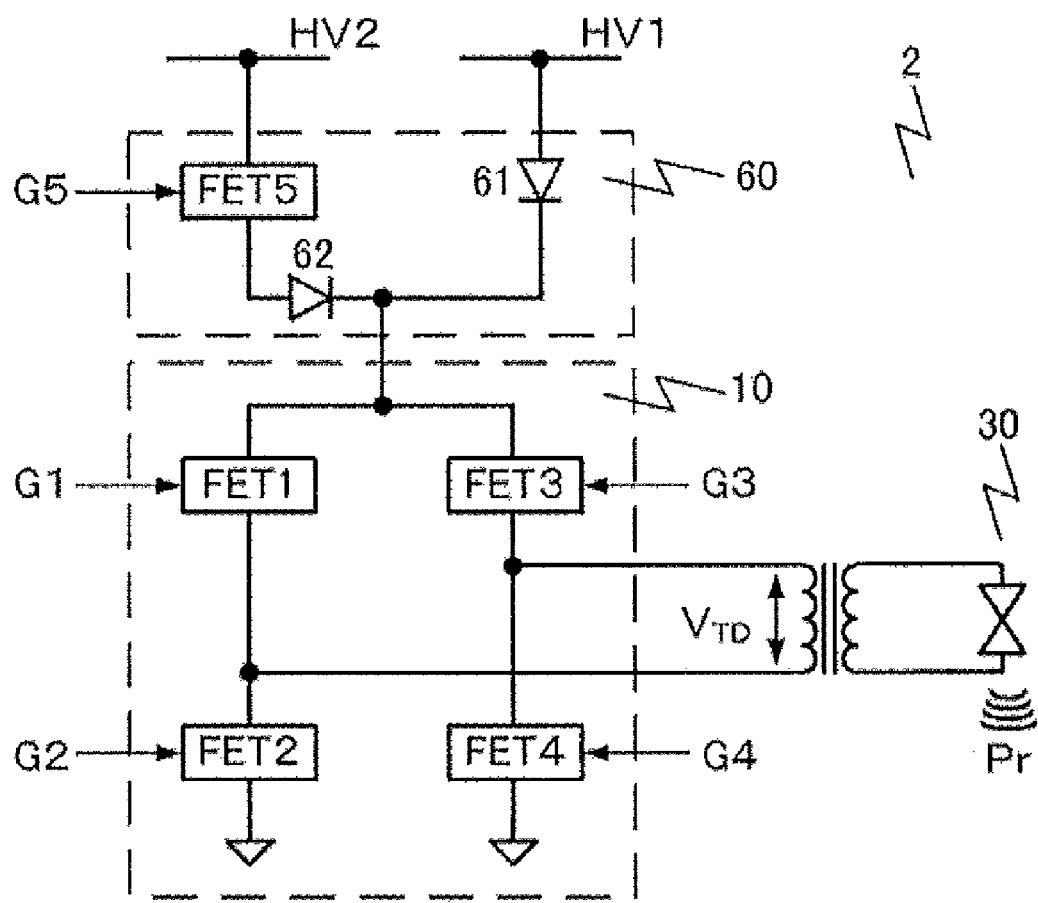
FIG. 6 is a circuit diagram showing an example the configuration of the underwater detector shown in FIG. 5.

FIG. 5 is a block diagram showing a configuration of the underwater detector 2 of this embodiment according to the invention. The voltage control circuit 60 controls the voltage supplied to the switching circuit 10. The switching circuit 10 is coupled with a power source HV1 and a power source HV2 via the voltage control circuit 60 which switches between voltage supplies from the power source HV1 and the power source HV2.

The gate signal generating module 70 performs pulse-width modulation of the reference signal $V_{TD}$ generated in the switching circuit 10 by the pulse-width modulation method. At this time, the gate signal generating module 70 performs pulse-width modulation in response to switching the power source by the voltage control circuit 60.

In this way, the envelope control of the ultrasonic signal Pr is performed by switching the power source with the voltage control circuit 60 and pulse-width modulation by the gate signal generating module 70, such that the controlled width of the envelope can be larger than that of related art. Further, the voltage control circuit 60 controls the voltage supplied from the power source HV by switching the power source supplying voltage, not by using the control signal Vi as the voltage control circuit 40 of the previous embodiment, enabling loss of voltage supplied from the power source to be prevented.

Next, a circuit configuration which is able to achieve the envelope control described above is explained with reference to FIG. 6. The voltage control circuit 60 includes a diode 61, a diode 62 and a FET5. The power source HV1 is coupled to the switching circuit 10 via the diode 61. The power source HV2 is coupled to the switching circuit 10 via the FET5 and the diode 62. Note that the voltage of the power source HV2 is higher than the voltage of the power source HV1.

Switching of the FET5 is controlled by a gate signal G5 of binary signals. When the FET5 is ON, the diode 62 is ON because the voltage of the power source HV1 is higher than the voltage of the power source HV2. That is, the switching circuit 10 is supplied with the voltage of the power source HV2. Whereas when the FET5 is OFF, the diode 61 is ON, and the switching circuit 10 is supplied with the voltage of the power source HV1.

Figure 7:
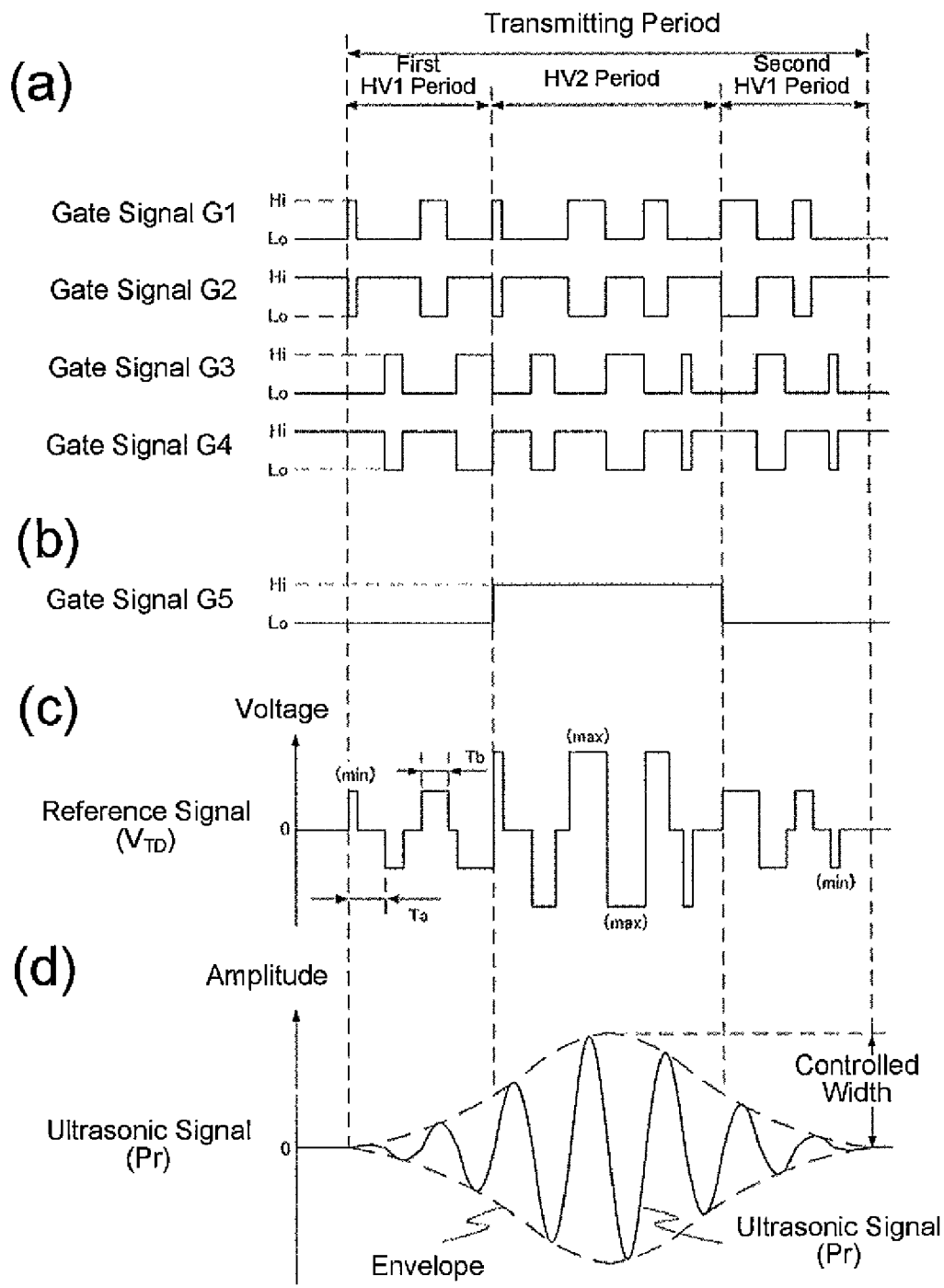
FIG. 7 is graphs showing waveforms of a gate signal, reference signal, and ultrasonic signal of the underwater detector shown in FIG. 5.

Next, a description is given of waveforms from the gate signal G1 to the gate signal G5, the reference signal $V_{TD}$ and the ultrasonic signal Pr with reference to FIG. 7. FIG. 7 represents each of the signal waveforms during a period of transmitting the signals by the underwater detector 2. The underwater detector 2 performs detection by receiving an echo of the ultrasonic signal Pr during the receiving period (not shown) of a predetermined time provided after the transmitting period.

The gate signal G1 and the gate signal G3 have a waveform as shown in (a) of FIG. 7 and rise respectively at a constant cycle. The pulse widths of the gate signal G1 and the gate signal G3 are modulated. The gate signal G2 and the gate signal G1 are reversed in phase and the gate signal G4 and the gate signal G3 are reversed in phase.

The gate signal G5 has a waveform as shown in (b) of FIG. 7, and is Hi in a predetermined period and Lo in a period before and after thereof. Note that when the gate signal G5 is Lo, the voltage for generating the reference signal $V_{TD}$ is the power source HV1 voltage, and here, a former period of Lo is referred to as a "first HV1 period" and a latter period of Lo is referred to as a "second HV1 period." When the gate signal G5 is Hi, the voltage for generating the reference signal $V_{TD}$ is the power source HV2 voltage, and here, such a period is referred to as an "HV2 period." The gate signal G5 like this controls switching of the FET5 to perform the voltage control of the reference signal $V_{TD}$.

The reference signal $V_{TD}$ has a waveform as shown in (c) of FIG. 7, and rises to a positive voltage when both the gate signal G1 and the gate signal G4 are Hi and falls to a negative voltage when both the gate signal G2 and the gate signal G3 are Hi. The ultrasonic signal Pr has the frequency determined by a pulse interval Ta of the reference signal $V_{TD}$ and amplitude determined by a pulse width Tb and a voltage controlled by the control signal Vi. Incidentally, the voltage of the reference signal $V_{TD}$ is a voltage supplied based on the gate signal G5.

Here, the pulse width Tb of the reference signal $V_{TD}$ is described for each case of the periods.

(1) First HV1 Period

The pulse width Tb of the reference signal $V_{TD}$ is made gradually longer. At this time, the pulse width Tb is made gradually longer from the response limit time (hereinafter, referred to as "min") of the FET included in the switching circuit 10 so as to be able to make the maximum of an envelope controlled amount of the ultrasonic signal Pr based on the pulse-width modulation.

(2) HV2 Period

After the pulse width Tb is made gradually longer in the first HV1 period, the pulse width Tb of the first pulse in this HV2 period is made to have a length so that the envelope of the ultrasonic signal Pr may continue when switching the voltage based on the immediately before pulse width Tb and the voltage difference between the power source HV1 and the power source HV2. Then, the pulse width Tb is made longer gradually to be longest in the middle of this HV2 period. That is the amplitude of the ultrasonic signal Pr which is the largest across the transmitting period. At this time, the pulse width Tb is made the same length as the pulse interval Ta at the middle of this HV2 period (hereinafter, referred to as "max") so as to be able to make the maximum of an envelope controlled amount of the ultrasonic signal Pr based on the pulse-width modulation. Thereafter, the pulse width Tb is made gradually shorter symmetrically with respect to being made gradually longer.

(3) Second HV1 Period

After the pulse width Tb is made gradually shorter in the HV2 period, the pulse width Tb of the first pulse in this second HV1 period is made to have a length so that the envelope of the ultrasonic signal Pr may continue when switching the voltage based on the immediately before pulse width Tb and the voltage difference between the power source HV1 and the power source HV2. This length is equal to the length of the last pulse width Tb in the first HV1 period. Then, the pulse width Tb is made gradually shorter symmetrically with respect to the first HV1 period. At this time, similarly to the first HV1 period, the pulse width Tb is made short to a min so as to be able to make the maximum of an envelope controlled amount of the ultrasonic signal Pr based on the pulse-width modulation.

The reference signal $V_{TD}$ like the previous is applied to the transducer 30 such that the ultrasonic signal Pr as shown in (d) of FIG. 7 is transmitted underwater. As described above, in the embodiment, the controlled amount can be added with the voltage control by switching the voltage to make the controlled width of the envelope larger than that of related art. Therefore, it is possible to provide the underwater detector which can suppress the occurrence of spurious signals.

Incidentally, if the control of 40 dB as an envelope control is required, the controlled width with the voltage control is set to 20 dB, and the controlled width with the pulse-width modulation method is set to 20 dB. Further, allocation of these controlled widths may be determined according to an equipment specification such as the response speed of the FET installed. In addition, the pulse modulation method using the switching circuit is not limited to the above described pulse-width modulation method, but may be a Pulse Density Modulation (PDM) method and the like.

Further, when performing detection by use of the pulse compression technique, the range side lobe level can be made small.

Figure 8A:
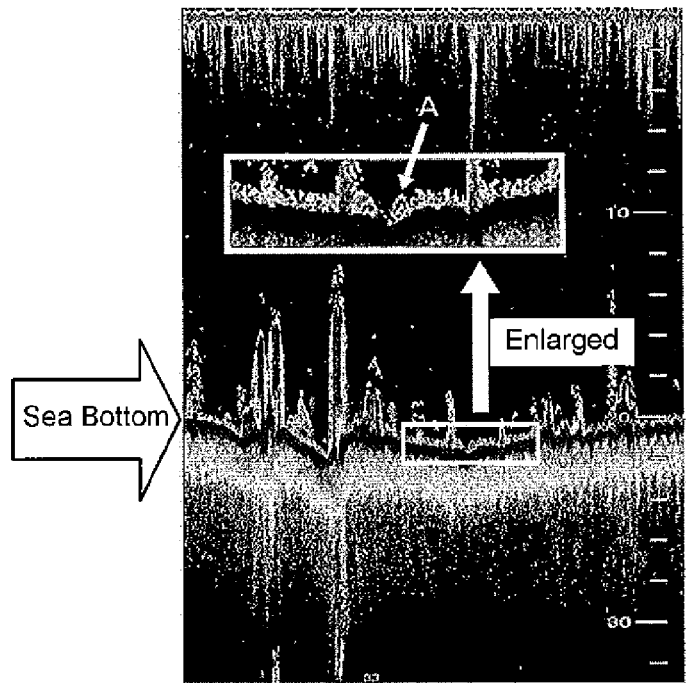
FIGS. 8A and 8B are views showing example display images of the underwater detector shown in FIG. 5.
Figure 8B:
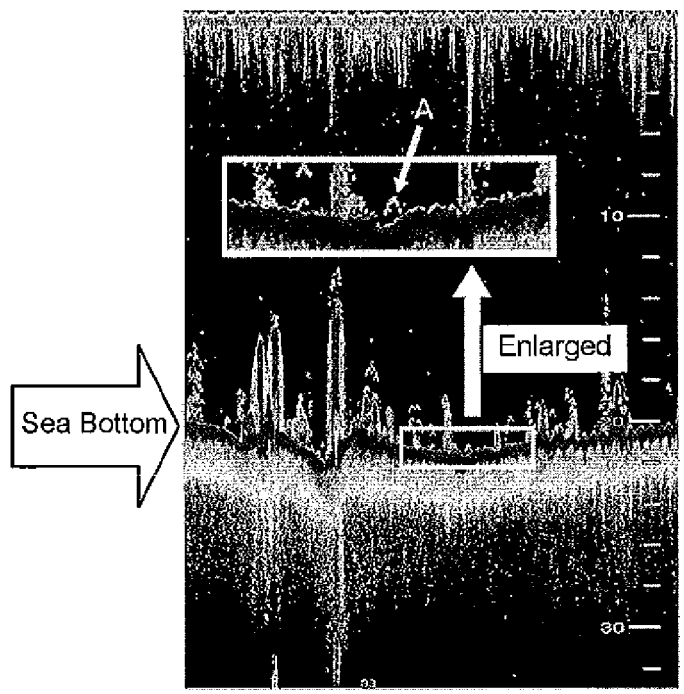
Figure 9:
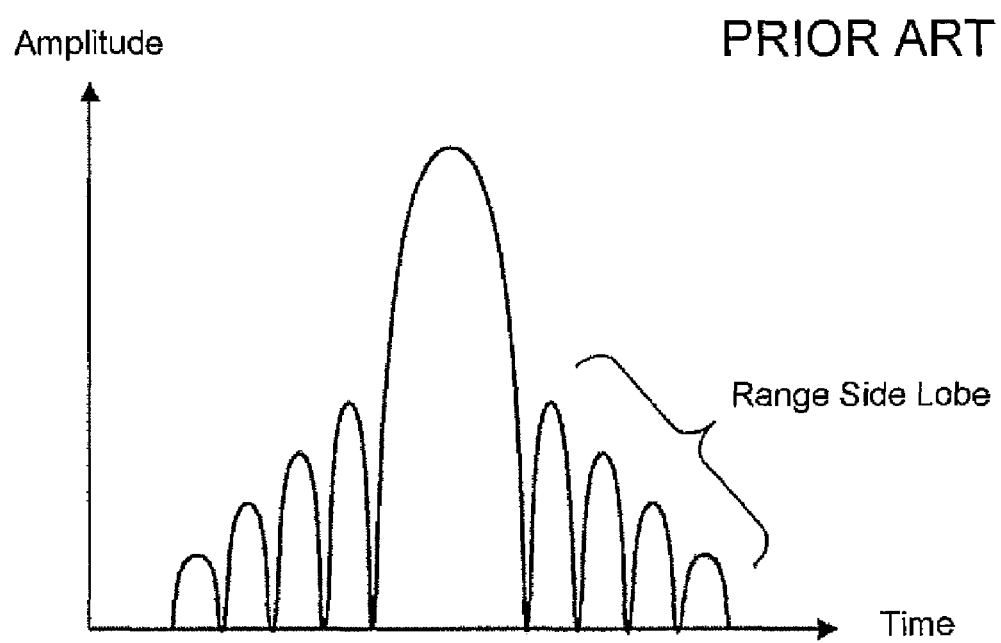
FIG. 9 is a view showing an example of an echo waveform received by a conventional underwater detector.
Figure 10:
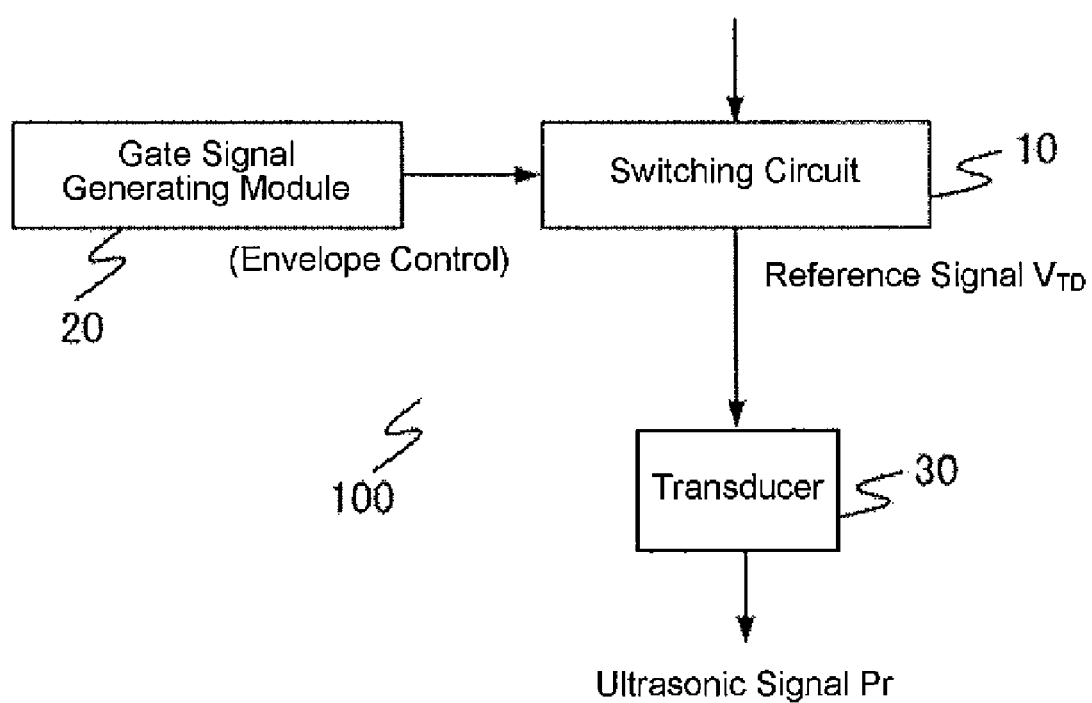
FIG. 10 is a block diagram showing a configuration of the conventional underwater detector.
Figure 11:
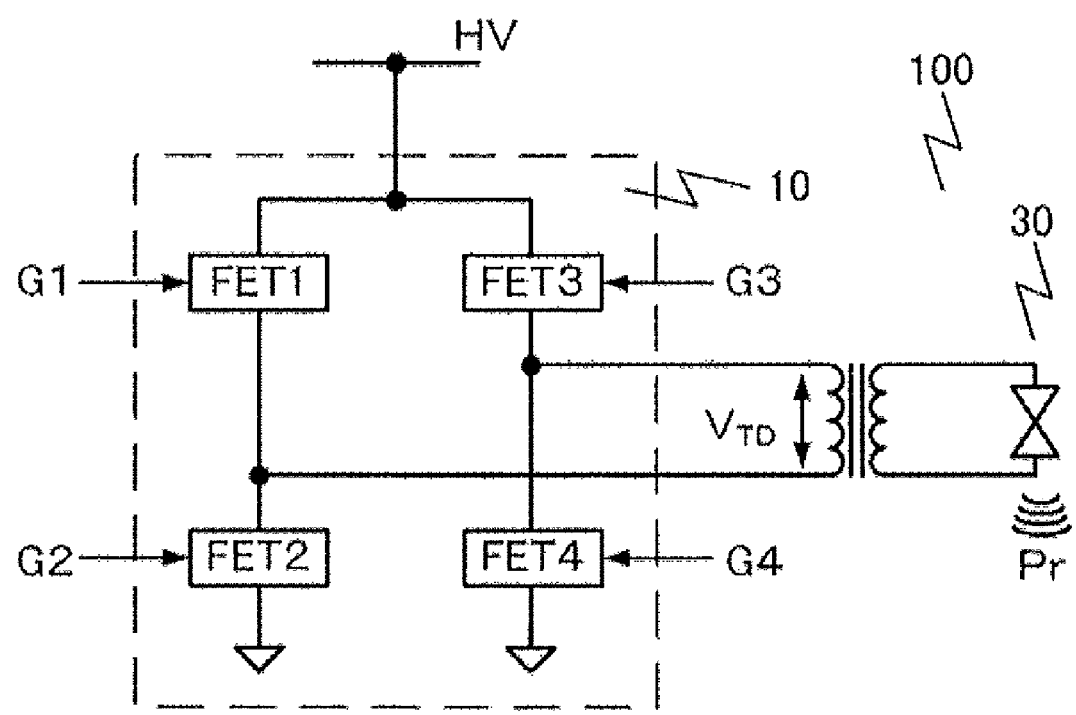
FIG. 11 is a circuit diagram showing an example the configuration of the conventional underwater detector shown in FIG. 10.
Figure 12:
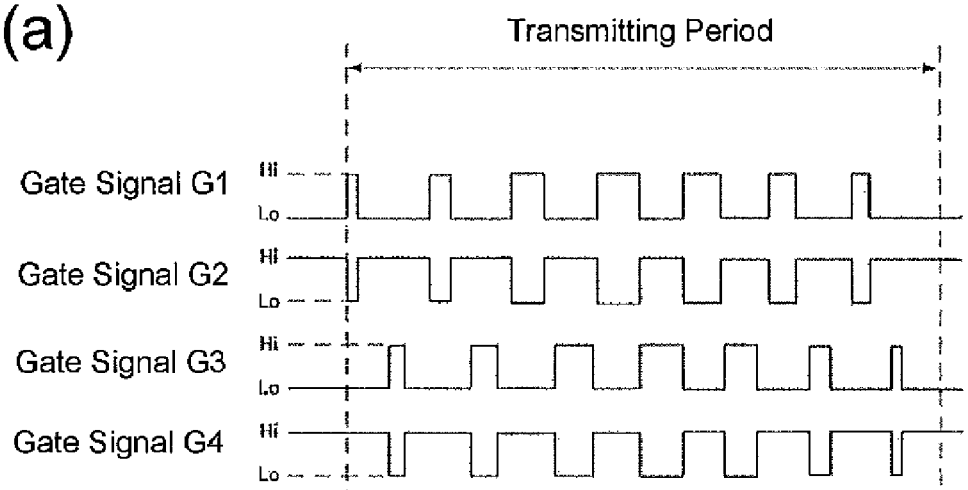
FIG. 12 is graphs showing waveforms of a gate signal, reference signal, and ultrasonic signal of the conventional underwater detector shown in FIG. 10.
Figure 12:
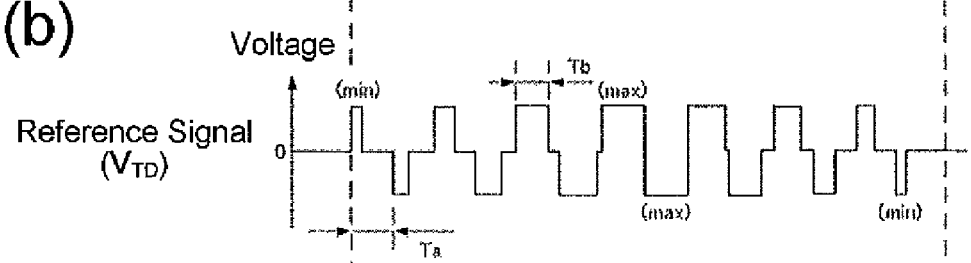
Figure 12:
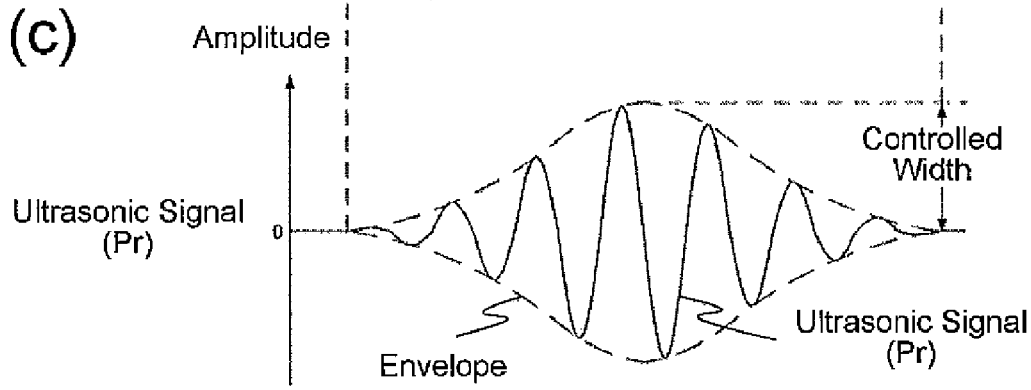

In order to compare detected images depending on a variety of the range side lobe levels, a display example of underwater detection by the underwater detector of related art is shown in FIG. 8A, and a display example of underwater detection by the underwater detector 2 of the invention is shown in FIG. 8B. Note that the targets displayed by both underwater detectors are equal. A lengthwise direction means the depth and the scale is indicated on the right side. For example, the bottom of the sea is displayed at a depth of about 20 m. A widthwise direction means time and the latest information detected is indicated on the right side. The image is renewed every detection being scrolled from the right side to the left side. The detected information is indicated from the right side to the left side of the image in time series.

In an enlarged diagram shown in FIG. 8A, "A" is an echo indicating a fish, which is overlapped with a noise displayed by the range side lobe level of the echo from the bottom of the sea, making confirmation of the fish "A" difficult. However, with the underwater detector 2 of the invention in which the range side lobe level can be reduced, the noise displayed in the vicinity of the bottom of the sea is found to become small as shown in FIG. 8B. Therefore, fish "A" can be easily confirmed as shown in the enlarged diagram in FIG. 8B.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises", "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. An underwater detector comprising:
   a single power source for applying a predetermined voltage;
   a voltage control circuit for controlling the voltage based on a control signal;
   a gate signal generating module for outputting a gate signal having a constant duty cycle;
   a switching circuit for outputting a reference signal based on the voltage controlled by the voltage control circuit and the gate signal outputted from the gate signal generating module; and
   a transducer for transmitting an ultrasonic signal underwater, an envelope of which being controlled based on a waveform of the control signal by being applied with the reference signal.

2. The underwater detector of claim 1, wherein the gate signal generating module outputs a gate signal, a rising edge cycle of which being changed, and the transducer transmits an ultrasonic signal of which the frequency being changed with time.

* * * * *